(12) United States Patent
Sumiya et al.

(10) Patent No.: US 8,434,736 B2
(45) Date of Patent: May 7, 2013

(54) FLUID PASSAGE VALVE

(75) Inventors: Takenori Sumiya, Utsunomiya (JP);
Moriyoshi Awasaka, Shioya-gun (JP);
Yuya Yamazaki, Utsunomiya (JP);
Hirotaka Otaki, Utsunomiya (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 13/239,761

(22) Filed: Sep. 22, 2011

(65) Prior Publication Data

US 2012/0074344 A1 Mar. 29, 2012

(30) Foreign Application Priority Data

Sep. 28, 2010 (JP) ................................. 2010-216295
Sep. 28, 2010 (JP) ................................. 2010-216488

(51) Int. Cl.
*F16K 31/44* (2006.01)
(52) U.S. Cl.
USPC ........................................ 251/215; 251/192
(58) Field of Classification Search .................... 251/77, 251/78, 82, 83, 170, 192, 215, 251, 252; 137/625.31, 625.33
See application file for complete search history.

(56) References Cited

U.S. PATENT DOCUMENTS 3,605,789 A * 9/1971 Graham ........................ 137/240
4,073,473 A * 2/1978 Rihm et al. ................... 251/298

FOREIGN PATENT DOCUMENTS

JP 57-114068 7/1982

* cited by examiner

*Primary Examiner* — John K Fristoe, Jr.
*Assistant Examiner* — Reinaldo Sanchez-Medina
(74) *Attorney, Agent, or Firm* — Nelson Mullins Riley & Scarborough LLP; Anthony A. Laurentano

(57) ABSTRACT

A fluid passage valve is equipped with a valve body which is disposed rotatably through first and second shafts, a movable seat having a communication hole therein, and an elastic member that urges the movable seat toward a side opposite from the valve body. The first and second shafts are assembled and installed on the valve body such that an axis thereof is disposed at a position offset from a center of curvature of a spherical surface portion of the valve body. The fluid passage valve is placed in a valve-closed condition by the spherical surface portion abutting against a seating surface and closing the communication hole, and is placed in an open condition by the valve body separating away from the movable seat and thereby opening the communication hole.

6 Claims, 4 Drawing Sheets

FLUID PASSAGE VALVE

CROSS-REFERENCE TO RELATED APPLICATION

This application is based upon and claims the benefit of priority from Japanese Patent Applications No. 2010-216488 filed on Sep. 28, 2010 and No. 2010-216295 filed on Sep. 28, 2010, of which the contents are incorporated herein by reference.

BACKGROUND OF THE INVENTION

1. Field of the Invention

The present invention relates to a fluid passage valve for switching a flow condition of a fluid by opening and closing a fluid passage through which the fluid flows.

2. Description of the Related Art

Heretofore, a fluid passage valve has been known, which is connected, for example, to a fluid passage through which a fluid flows, for controlling a flow condition of the fluid by switching a communication state of the fluid passage. In this type of fluid passage valve, a ball valve is provided in the interior of a valve main body, and by rotating a shaft, which is connected to an upper portion of the ball valve, a through hole of the ball valve causes a pair of passages (a gas fluid inlet and a gas fluid outlet) that are formed in the valve main body to be brought into communication with each other. Further, on the gas fluid inlet side and the gas fluid outlet side of the ball valve, a fixed seat and a movable seat are disposed sandwiching the ball valve therebetween, and the ball valve is retained between the fixed seat and the movable seat by means of a spring member, which urges the movable seat toward the side of the ball valve. As a result of this structure, because the ball valve is always maintained in contact with the fixed seat and the movable seat, the sealing characteristics thereof can be ensured (for example, refer to Japanese Laid-Open Patent Publication No. 57-114068).

SUMMARY OF THE INVENTION

With the aforementioned conventional technique, because the ball valve and the movable seat are in contact within a fixed range, the valve cannot be opened in communication unless the fixed range is exceeded. Stated otherwise, since the ball valve opens after the shaft is rotated, a phase difference occurs between rotation of the shaft and opening of the valve. With such a structure, it has been difficult to obtain a flow rate characteristic that is proportional to rotation of the shaft.

The present invention has been made while taking into consideration this condition. The present invention has a principal object of providing a fluid passage valve, in which separation between a valve body and a seat can be performed smoothly, control of flow rate proportional to shaft rotation is made possible, and in which suitable flow rate characteristics can be assured.

Further, with the aforementioned conventional technique, because the ball valve is always in contact with and moves in sliding contact between the movable seat and the fixed seat, friction is normally generated between the structural elements, and hence there are problems related to wear and durability of such structural elements. Further, since the spring member presses the ball valve, the pressing load produces an effect of its own on vibration resistance.

To resolve such problems, it has been considered to provide a structure in which the fixed seat is eliminated, and wherein the ball valve is seated on the movable seat only at times when the valve is closed. Further, in such a structure, because sealability between the movable seat and the ball valve is ensured, a structure is provided in which the movable seat is displaced in a direction perpendicular to the axial direction, and in which the movable seat has an alignment function.

On the other hand, in the case of a fluid passage valve (e.g., and ERG valve), which opens and closes a fluid passage through which a gas including foreign objects (unwanted materials, e.g., combustion products) therein flows, such foreign objects become deposited in the vicinity of sliding portions of the movable seat, and adversely affect (deteriorate) the sliding properties of the movable seat. As a result, the aforementioned alignment function of the movable seat becomes further deteriorated, with the concern that the sealing characteristics thereof cannot be assured.

Consequently, the present invention has the object of providing a fluid passage valve in which wear caused by friction between the valve body and the seat can be reduced, which enables vibration resistance to be improved, and in which sealability between the valve body and the seat can effectively be ensured.

To achieve the above objects, a fluid passage valve according to the present invention is characterized by a main body comprising a valve body, which is disposed rotatably through a shaft, and a valve chamber in which the valve body is accommodated, a movable seat having a seating surface on which the valve body is seatable, and an elastic member for urging the movable seat toward a side opposite from the valve body about the movable seat. The valve body includes, as at least one portion thereof, a spherical surface portion formed as a spherical surface, the shaft is installed on the valve body such that an axis thereof is disposed at a position offset from a center of curvature of the spherical surface portion, the movable seat includes a communication hole therein, an axis of which lies substantially perpendicularly to the axis of the shaft, the spherical surface portion of the valve body abuts against the seating surface thereby producing a valve-closed condition by closing the communication hole, and a valve-open condition is produced by separating the valve body from the movable seat and opening the communication hole.

According to the above configuration, the valve body rotates (swings or rocks) about an axis of rotation that is disposed in an offset manner, whereby a valve-closed condition is created by seating the valve body on the movable seat, and a valve-open condition is created by separating the valve body away from the movable seat. With this structure, when the valve body in a valve-closed condition is swung in a direction to separate away from the movable seat, follow-on movement of the movable seat toward the valve body is curtailed forcibly by a biasing force of the elastic member in a direction opposite to the valve body. In particular, when the valve body separates away from the movable seat, because the valve body is separated without being followed-on by the movable seat, immediately after rotation of the shaft, the communication hole can be opened substantially without any phase difference, thereby enabling a flow rate control that is proportional to rotation of the shaft, while assuring appropriate flow rate characteristics. Further, the fixed seat of the conventional technique is unnecessary, and contact of the valve body with the movable seat takes place only during the valve-closed condition in which the valve body is seated on the movable seat. Thus, because the valve body and the movable seat are not continuously in contact with each other, friction between the valve body and the movable seat can be decreased, and an increase in rotational torque can be prevented. Further, the spring load of the return spring can be received directly by the movable seat, and there is no need to provide an additional positioning stopper to determine a fully closed position, so that costs can be reduced. Moreover, since vibrations from the movable seat are not transmitted during times when the valve body is separated away from the movable seat, the influence on vibration resistance can be minimized.

In the fluid passage valve described above, if an angle between the axis of the movable seat and the seating surface is defined as a seat angle, then as viewed in cross section in a plane that is perpendicular to the axis of the shaft and that includes a center of curvature of the valve body, within a region on a side opposite to the movable seat about a line perpendicular to the axis of the movable seat and passing through the center of curvature of the spherical surface portion of the valve body in the valve-closed condition, an axis of rotation of the valve body may preferably be set within an area defined by an angle of the seat angle around the center of curvature with respect to the line.

When the position of the center of rotation of the valve body is set in the foregoing manner, because the rotational trajectory of the valve body does not pass through the interior of the movable seat, the valve body is not pressed upon by the movable seat, and "gouging" (abrasion) between the valve body and the movable seat can be prevented. Accordingly, since separation between the valve body and the movable seat can smoothly be carried out, follow-on movement of the movable seat toward the valve body can effectively be curtailed, and an appropriate flow rate can be assured.

In the fluid passage valve, a ring-shaped side projection may be provided on at least one of the movable seat and a seat confronting portion on the main body that confronts the movable seat, the ring-shaped side projection projecting in the axial direction and abutting against (contacting) the other of the movable seat and the seat confronting portion, and a sliding interface between the movable seat and the seat confronting portion may preferably be positioned more outwardly than an area of contact of the valve body and the seating surface.

In accordance with the foregoing structure, because the valve body and the movable seat are not always in contact with each other, friction between the valve body and the movable seat can be reduced, together with lessening the influence of such friction on vibration resistance. Further, the movable seat and the seat confronting portion are in sliding contact at the end surface of the ring-shaped side projection, and because the sliding movement area is small, sliding resistance at the sliding interface when displacement occurs in a direction perpendicular to the axis of the movable seat can be decreased, and the alignment function of the movable seat can advantageously be exhibited. Accordingly, generation of leakage can be effectively prevented. Still further, because the sliding interface between the movable seat and the seat confronting portion is positioned more outwardly than an area of contact between the valve body and the seating surface in the valve-closed condition, the movable seat is supported stably by the seat confronting portion, so that when the valve body is seated on the movable seat, the movable seat does not become inclined or tilted, and generation of leakage can effectively be prevented.

Further, in the fluid passage valve, an annular wall may preferably be disposed on one of the seat confronting portion and the movable seat and be positioned more inwardly than the ring-shaped side projection, the annular wall projecting in the axial direction in close proximity with respect to the other of the seat confronting portion and the movable seat.

In accordance with this structure, because the annular wall functions as a barrier, it is difficult for gas that is introduced through the gas fluid inlet to reach the aforementioned sliding interface. Consequently, foreign objects contained within the gas are not easily deposited on the inner circumferential side of the sliding interface between the movable seat and the seat confronting portion, and hence slidability of the sliding interface can more suitably be assured.

In the above fluid passage valve, an annular outer circumferential projection may preferably be provided on an outer circumferential portion of the movable seat, which projects outwardly and in close proximity with respect to an inner circumferential surface of the valve chamber.

According to this structure, because the annular outer circumferential projection also functions as a barrier, it is difficult for gas from the side of the valve body to reach the outer circumferential side of the aforementioned sliding interface. Consequently, foreign objects contained within the gas are not easily deposited on the outer circumferential side of the sliding interface between the movable seat and the seat confronting portion, and hence slidability of the sliding interface can more suitably be assured.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Below, explanations shall be made with reference to the accompanying drawings, concerning a preferred embodiment of a fluid passage valve according to the present invention.

Figure 1:
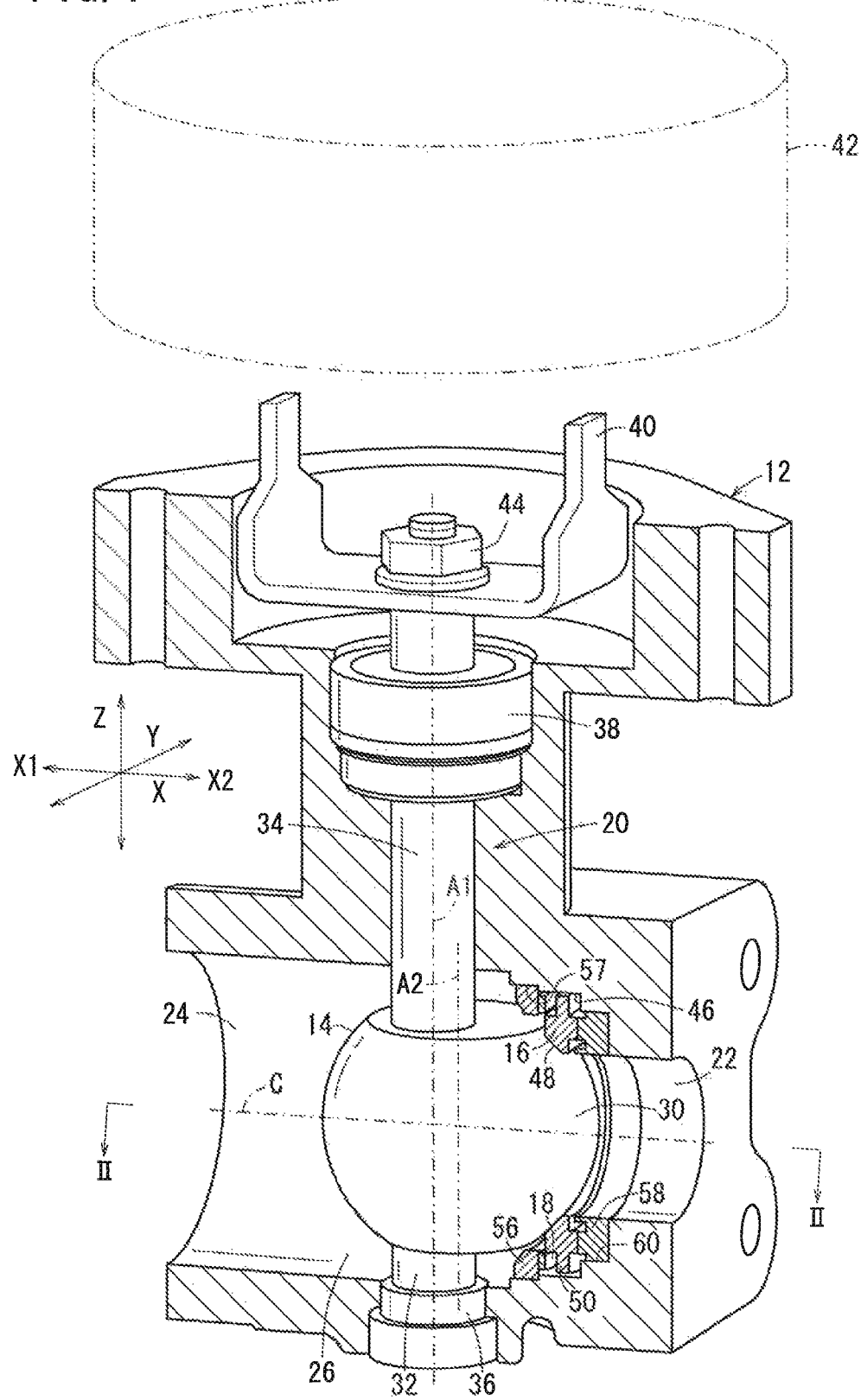
FIG. 1 is a perspective view, partially illustrated in cross section, of a fluid passage valve according to an embodiment of the present invention.

FIG. 1 is a perspective view, partially illustrated in cross section, of a fluid passage valve 10 according to an embodiment of the present invention. The fluid passage valve 10 includes a main body 12, a valve body 14 that is disposed rotatably in the interior of the main body 12, a movable seat 16 that abuts against the valve body 14, an elastic member 18 that biases or urges the movable seat 16, and a drive force transmitting mechanism 20 disposed in an upper part of the main body 12 for applying a rotary driving force with respect to the valve body 14.

The fluid passage valve 10 according to the present embodiment is constituted as an exhaust gas recirculation valve (EGR valve) 10A, in which a gas fluid inlet 22, through which an exhaust gas is supplied including vaporized fuel therein, is provided on a lower part of the main body 12, and a gas fluid outlet 24, into which the exhaust gas is introduced and circulated to an internal combustion engine (not shown), is provided on an opposite side of the gas fluid inlet 22 via the valve body 14.

The gas fluid inlet 22 and the gas fluid outlet 24 are disposed substantially along a straight line in the main body 12. In the main body 12, a valve chamber 26 is formed between the gas fluid inlet 22 and the gas fluid outlet 24, and the spherical shaped valve body 14 is arranged rotatably in the interior of the valve chamber 26. On upper and lower portions of the valve body 14, flat shapes are formed, while the outer peripheral surface except the upper and lower portions thereof is constructed as a spherical surface portion 30. The valve body 14 abuts against the movable seat 16 at a portion (sealing surface) of the spherical surface portion 30.

Assuming that, on the valve body 14, the portion (sealing surface) that abuts against the movable seat 16 is formed in the shape of a spherical surface, then the entirety of the valve body 14 need not be spherical. For example, on the valve body 14, the side thereof opposite to a side confronting the movable seat 16 may be in the form of a cutout planar shape, or alternatively, the sealing surface that abuts against the movable seat 16 may be constituted as a disk-shaped valve body having the sealing surface on an outer circumference thereof.

On the lower portion of the valve body 14, an upper end of a first shaft 32 is connected and fixed thereto, whereas on the upper portion of the valve body 14, a lower end of a second shaft 34 is connected and fixed thereto. The first shaft 32 is rotatably supported about an axis A1 by a bearing 36, which is installed and fixed on a lower part of the main body 12. The second shaft 34 is rotatably supported about the axis A1 by a bearing 38, which is installed and fixed on an upper part of the main body 12. More specifically, the first shaft 32 and the second shaft 34 are rotated about a common axis A1. Moreover, the axis A1 is parallel to a line that is perpendicular to an axis C of the movable seat 16.

In FIG. 1, the axis C of the movable seat 16 is defined by a line that runs through respective centers of the gas fluid inlet 22 and the gas fluid outlet 24. Further, the direction of the arrow X is a direction along the axis C, whereas the direction of the arrow Z is a direction perpendicular to the X direction and which lies along the axis A1 of the first shaft 32 and the second shaft 34 (i.e., the vertical direction in FIG. 1). The direction of the arrow Y is a direction perpendicular to the X direction and the Z direction.

The position of the axis A1 of the first shaft 32 and the second shaft 34 is set at a position offset from the axis A2, which is parallel to the axis A1, and which passes through a center of curvature of the spherical surface portion 30 (in the case of a valve body 14 having a substantially spherical shape, the center thereof). More specifically, the axis A1 is set to be separated a predetermined distance from the axis A2 of the valve body 14. Owing thereto, the valve body 14 is mounted within the valve chamber 26 so as to be rotatable (swingable) about the axis A1, which is set at a position offset from the axis A2.

The drive force transmitting mechanism 20 includes the aforementioned second shaft 34, a rotatable yoke 40 connected to an upper end of the second shaft 34, and a drive source 42, which is connected to an upper part of the main body 12, for rotatably driving the second shaft 34 via the rotatable yoke 40.

The upper end of the second shaft 34 is fixed by being inserted through a substantially central portion of the rotatable yoke 40 and fastening the same with a nut 44. The drive source 42, for example, is made up from a stepping motor or a rotary actuator, which is driven rotatably upon being electrically energized. The rotary driving force thereof is transmitted to the second shaft 34 via the rotatable yoke 40, whereby the valve body 14 connected to the second shaft 34 is operated to rotate about the axis A1. In this case, the first shaft 32, which is connected to the lower part of the valve body 14, is rotated integrally with the valve body 14 while being supported by the bearing 36.

Figure 2:
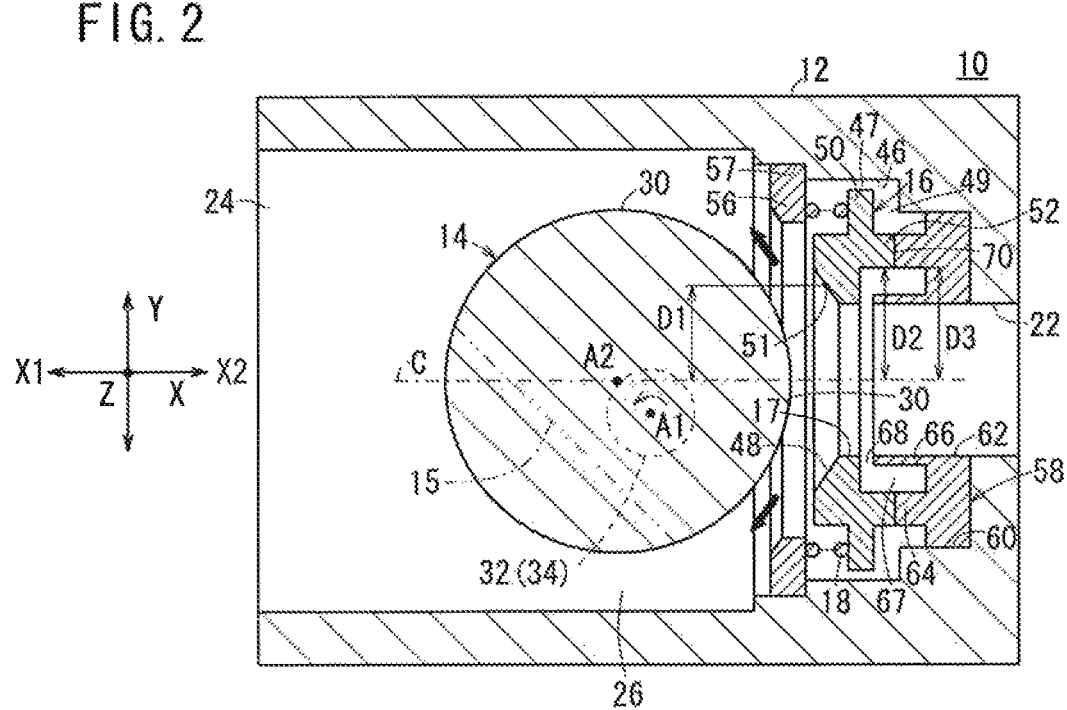
FIG. 2 is a cross sectional view taken along line II-II and showing a valve-open condition of a ball valve, in the fluid passage valve of FIG. 1.

FIG. 2 is a cross sectional view taken along line II-II and showing a valve-open condition of a valve body 14, in the fluid passage valve 10 of FIG. 1. Between the valve body 14 and the gas fluid inlet 22, a seat accommodating section 46 is formed that makes up part of the valve chamber 26, and a ring-shaped movable seat 16 is disposed in the seat accommodating section 46. A stopper 56 for supporting the elastic member 18 is arranged on a side in the X1 direction of the movable seat 16, whereas a seat-confronting portion 58 on which the movable seat 16 is mounted is arranged on a side in the X2 direction of the movable seat 16. The seat accommodating section 46 is formed with a circular shape in cross section along the shape of the outer circumference of the movable seat 16.

The movable seat 16 is capable of being displaced within a range regulated by the direction of the axis C, and is biased toward a side opposite from the valve body 14 (i.e., in the X2 direction) by the elastic member 18. A clearance 47 is provided between an outermost circumferential portion of the movable seat 16 and the inner circumferential surface of the seat accommodating section 46. As a result thereof, the movable seat 16 is arranged inside the main body 12 and is capable of being displaced in a direction perpendicular to the direction of the axis C. More specifically, the movable seat 16 is displaceable within the Y-Z plane. By means of such a displacement function of the movable seat 16, an alignment function, to be described later, is exhibited (produced).

A communication hole 17 is formed in the movable seat 16, which penetrates through the center thereof in the direction of the axis C, and a seating surface 48 on which the valve body 14 is seated is formed on a side in the X1 direction of the communication hole 17. The seating surface 48 is a conically shaped surface with the axis C of the movable seat 16 extending centrally therethrough, and forms a surface that is inclined a predetermined angle (the angle θ shown in FIG. 3) with respect to the axis C. More specifically, the seating surface 48 is formed such that the inner diameter thereof expands linearly in progression toward the side of the X1 direction.

An annular outer circumferential projection 50, which projects in a radial outward direction and extends circumferentially, is provided on the outer circumference of the movable seat 16. The outside diameter of the annular outer circumferential projection 50 is set to be smaller than the inside diameter of the seat accommodating section 46, such that the aforementioned clearance 47 is formed thereby. Further, an outside annular space 49, which is surrounded by the movable seat 16, the seat-confronting portion 58, and the seat accommodating section 46, is formed on the X2 direction side of the annular outer circumferential projection 50.

The clearance 47 formed between the annular outer circumferential projection 50 and the seat accommodating section 46 forms a gap that extends annularly. The clearance 47 may be set to a small gap, so as to suppress insofar as possible incursion of gas from the side of the valve body 14 into the outside annular space 49, within a range which is capable of securing a range of mobility for exhibiting the alignment function of the movable seat 16.

On a side surface of the movable seat 16, on a side (i.e., on the X2 direction side) opposite from the side on which the seating surface 48 is disposed, there is provided a first ring-shaped side projection (ring-shaped side projection) 52, which extends in the circumferential direction and projects in the direction of the axis C. The inside diameter D2 of the first ring-shaped side projection 52 is larger than the inside diameter of the communication hole 17, while the outside diameter of the first ring-shaped side projection 52 is smaller than the outer diameter of the annular outer circumferential projection 50. The end surface of the first ring-shaped side projection 52 forms a perpendicular plane with respect to the axis C.

The stopper 56 in the illustrated example is an annular member, which is fixedly mounted on a stopper mounting section 57 that is formed on the X1 direction side of the seat accommodating section 46. By abutment of the stopper 56, at an end surface on the X2 side thereof, against an end on the X1 direction side of the elastic member 18, displacement of the elastic member 18 along the direction of the axis C is regulated (restricted). The stopper 56 is not limited to having a ring shape, but may be constructed from a plurality of stopper pieces, which are arranged at intervals in the circumferential direction of the stopper mounting section 57.

The elastic member 18, at an end thereof on the X1 direction side, abuts against a side surface on the X2 direction side of the stopper 56, and at an end thereof on the X2 direction side, abuts against a side surface on the X1 direction side of the annular outer circumferential projection 50 of the movable seat 16. The elastic member 18 urges the movable seat 16 elastically toward the side of the X2 direction. The elastic member 18, according to the structural example thereof shown in FIG. 1, is constituted as a wave washer. Such a wave washer is a ring-shaped element, which is formed such that the phase of shape thereof differs according to the position thereof in the circumferential direction, and functions as a spring. The elastic member 18, however, is not limited to a wave washer, but may be another type of spring member such as a coil spring or the like, or alternatively, may be made up from a rubber elastic member having a function to urge the movable seat 16 toward the side opposite from the valve body 14.

The seat-confronting portion 58 is installed and fixed to a seat mounting section 60, which is formed on the X2 direction side of the seat accommodating section 46. The seat-confronting portion 58 according to one structural example is ring-shaped, and includes a communication hole 62, which penetrates in the axial direction through the center thereof. The communication hole 62 communicates with the communication hole 17 of the movable seat 16, and makes up a gas flow passage together with the communication hole 17. In the illustrated example, the inner diameter of the communication hole 62 is set substantially at the same diameter as the inner diameter of the communication hole 17 of the movable seat 16.

On a side portion of the movable seat 16 side (X1 direction side) of the seat-confronting portion 58, a second ring-shaped side projection (ring-shaped side projection) 64 is provided, which extends in a circumferential direction and projects axially. The inside diameter D3 of the second ring-shaped side projection 64 is greater than the inside diameter of the communication hole 62, and in the illustrated example, is substantially the same as the inside diameter D2 of the first ring-shaped side projection 52. The end surface of the second ring-shaped side projection 64 forms a plane, which is perpendicular with respect to the axis C.

As shown in FIG. 2, as a result of the movable seat 16 being urged toward the side of the seat-confronting portion 58 by the elastic member 18, the end surface of the first ring-shaped side projection 52 comes into abutment against the end surface of the second ring-shaped side projection 64. As noted previously, because the clearance 47 is formed between the outer circumference (annular outer circumferential projection 50) of the movable seat 16 and the seat accommodating section 46, the movable seat 16 is capable of being displaced while sliding with respect to the second ring-shaped side projection 64 of the seat-confronting portion 58, in the Y-Z plane that is perpendicular to the axis C.

Further, as noted above, the first ring-shaped side projection 52 and the second ring-shaped side projection 64 are formed in an annular shape together extending in the circumferential direction, and the end surface of the first ring-shaped side projection 52 as well as the end surface of the second ring-shaped side projection 64 is formed by a plane that is perpendicular with respect to the axis C. Owing thereto, a fluidtight condition is created mutually by the end surfaces around the full circumference in the circumferential direction, whereby sealing is established between the movable seat 16 and the seat-confronting portion 58.

As shown in FIG. 2, the inside diameter D2 of the first ring-shaped side projection 52 and the inside diameter D3 of the second ring-shaped side projection 64 are set to be greater than the diameter D1 of a circle (contact curve) traced by the area of contact 51 between the valve body 14 and the movable seat 16 in a valve-closed condition. Consequently, a sliding interface 70 between the movable seat 16 and the seat-confronting portion 58 is located more outwardly (toward the radially outward side) than the area of contact 51 between the valve body 14 and the movable seat 16 in the valve-closed condition.

On the seat-confronting portion 58, an annular wall 66 is further provided, which projects toward the side of the movable seat 16 and extends in a circumferential direction, at a location more radially inward than the second ring-shaped side projection 64, and additionally, an inside annular space 67 is formed between the second ring-shaped side projection 64 and the annular wall 66. The inside diameter of the annular wall 66 is the same as the inside diameter of the communication hole 62. The outside diameter of the annular wall 66 is set to be smaller than the inside diameters D2, D3 of the first ring-shaped side projection 52 and the second ring-shaped side projection 64.

The length of the annular wall 66 is set such that a location at the end of the annular wall 66 is positioned more toward the side of the movable seat 16 (X1 direction side) than the second ring-shaped side projection 64, and such that an annular clearance 68 is formed between the end of the annular wall 66 and the movable seat 16.

The clearance 68 forms a gap that extends in an annular shape, and in the illustrated example, is located more toward the side of the valve body 14 than the sliding interface (portions in contact) 70 between the first ring-shaped side projection 52 and the second ring-shaped side projection 64. The clearance 68 may be set minimally, to a degree which enables incursion of gas into the inside annular space 67 to be suppressed as much as possible.

In the illustrated example, a structure has been shown in which the seat-confronting portion 58 and the main body 12 are separate elements. However, a shaped portion corresponding to the seat-confronting portion 58 may also be formed integrally at an interior portion of the main body 12 as a part thereof.

The fluid passage valve 10 according to the present embodiment is constructed basically as described above. Next, operations and advantages of the fluid passage valve 10 shall be explained. Explanations shall be made, while regarding as an initial position the valve-closed condition, shown in FIG. 1, in which the fluid passage between the gas fluid inlet 22 and the gas fluid outlet 24 is blocked by the valve body 14.

As shown in FIG. 1, in the initial position, the spherical surface portion 30 on the side surface of the valve body 14 abuts against the seating surface 48 provided on the movable seat 16. More specifically, the valve body 14 is seated on the movable seat 16, and the communication hole 17 of the movable seat 16 is placed in a valve-closed condition. As described above, because the movable seat 16 is capable of being displaced in a direction perpendicular to the direction of the axis C, when the valve body 14 is seated on the movable seat 16, even if slippage occurs between the valve body 14 and the movable seat 16 due to manufacturing or assembly errors, the position of the movable seat 16 is adjusted automatically. More specifically, the movable seat 16 is aligned automatically, and the entire circumference is sealed tightly circumferentially between the spherical surface portion 30 and the seating surface 48, so that sealability therebetween can be assured.

Further, as a result of the movable seat 16 being urged by the elastic member 18 toward the side of the seat-confronting portion 58, sealing is effected between the movable seat 16 and the seat-confronting portion 58. In this manner, by effecting sealing between the valve body 14 and the movable seat 16, as well as between the movable seat 16 and the seat-confronting portion 58, the fluid passage between the gas fluid inlet 22 and the gas fluid outlet 24 is blocked. Consequently, although a non-illustrated gas is supplied to the gas fluid inlet 22, the gas does not flow downstream past the movable seat 16.

From the aforementioned valve-closed condition, when the drive source 42 shown in FIG. 1 is energized, a rotary drive force from the drive source 42 is transmitted via the rotatable yoke 40 to the second shaft 34, and the valve body 14, which is connected to the second shaft 34, is rotated about the axis A1, which is set at a position offset from the axis A2, to thereby result in the condition shown in FIG. 2. In this manner, in a case where the valve body 14 is rotated about the offset axis A1, the valve body 14 is displaced in a backward direction (X1 direction) with respect to (i.e., away from) the movable seat 16.

In this case, because the movable seat 16 is urged by the elastic member 18 toward the side of the seat-confronting portion 58, following-up of the movable seat 16 toward the valve body 14 is curtailed, and the valve body 14 separates away from the movable seat 16 along with being displaced toward the X1 direction side. As a result, a gap is formed between the movable seat 16 and the valve body 14, and a valve-open condition is established. In such a valve-open condition, the non-illustrated gas supplied to the gas fluid inlet 22 flows through the gap formed between the movable seat 16 and the valve body 14, and flows from the gas fluid outlet 24 and is directed into a non-illustrated internal combustion engine.

As described above, in accordance with the fluid passage valve 10 (EGR valve 10A) according to the present embodiment, the valve body 14 is rotated (swung) about the offset axis of rotation, to result in a valve-closed condition by seating of the valve body 14 on the movable seat 16, and a valve-open condition occurs as a result of the valve body 14 separating away from the movable seat 16. With such a structure, the fixed seat of the conventional technique is unnecessary, and contact of the valve body 14 with the movable seat 16 occurs only during the valve-closed condition in which the valve body 14 is seated on the movable seat 16. Further, because the valve body 14 is not continuously in contact with the movable seat 16, frictional wearing of the valve body 14 and the movable seat 16 can be reduced, and an increase in rotational torque can be prevented.

Further, when the valve body 14 in the valve-closed condition is swung in a direction to separate away from the movable seat 16, following-up of the movable seat 16 toward the valve body 14 is forcibly curtailed by the biasing force of the elastic member 18 in a direction opposite to movement of the valve body 14. In particular, in a case where the valve body 14 is separated away from the movable seat 16, the valve body 14 becomes separated therefrom without being followed-on by the movable seat 16, and therefore, frictional wear between the valve body 14 and the movable seat 16 can be reduced, and since the gas flow passage opens immediately following rotation of the shaft, control of the gas flow rate, which is proportional to rotation of the shaft, can easily be achieved, and an appropriate flow rate characteristic can be assured. Furthermore, because vibration of the movable seat 16 is not transmitted to the valve body 14 during times when the valve body 14 is separated away from the movable seat 16, the influence thereof on vibration resistance can be lessened.

Still further, because the movable seat 16 is arranged to be displaceable in a direction perpendicular to direction of the axis C, when the valve body 14 is seated on the movable seat 16, even if slippage occurs between the valve body 14 and the movable seat 16 due to manufacturing or assembly errors, the position of the movable seat 16 is adjusted automatically, since the movable seat 16 is capable of movement in a direction perpendicular to the axis, following the surface (spherical surface portion 30) of the valve body 14. More specifically, the spherical surface portion 30 tightly circumferentially contacts the seating surface 48, so that sealability therebetween can be assured. Stated otherwise, by the movable seat 16 exhibiting an alignment function, the above-mentioned errors (tolerances) can be permitted. Owing thereto, during a valve-closed condition, the valve body 14 and the movable seat 16 can be reliably and tightly sealed, and a favorable sealing condition can be assured.

In the present embodiment, because the valve body 14 is substantially spherically shaped, without concern to the rotational state of the valve body 14 within the range of rotation of the valve body 14, as the valve body 14 is viewed from an upstream side through the communication hole 17, only the spherical surface portion 30 thereof normally is visible. More specifically, in the event that the valve body 14 is looked at across the movable seat 16, even if the valve body 14 is in the valve-closed condition (see FIG. 1), in the valve-open condition (see FIG. 2), or in a midway condition from the valve-open condition to the valve-closed condition, normally only the spherical surface portion 30 is seen.

Accordingly, regardless of the rotational state of the valve body 14, the spherical surface portion 30 of the valve body 14 faces toward and confronts the communication hole 17 of the movable seat 16. Therefore, gas that penetrates through the communication hole 17 of the movable seat 16 flows normally along the spherical surface portion 30 of the valve body 14 and into the valve chamber 26 on the downstream side. As a result, the gas flow rate is substantially proportional to the angle of rotation of the valve body 14, and a linear gas flow rate characteristic can be guaranteed.

Moreover, for guaranteeing a linear gas flow rate characteristic, it is not necessary for substantially the entirety of the valve body 14 to be composed of the spherical surface portion 30, and the range in which the spherical surface portion 30 is formed on the valve body 14 may be set such that only the spherical surface portion 30 normally is made visible, when viewed from the upstream side of the valve body 14 through the communication hole 17 of the movable seat 16, regardless of the rotational state of the valve body 14 within the range of rotation of the valve body 14. Accordingly, for example, as shown in FIG. 2, a flat part 15 (indicated by the imaginary line) with respect to the valve body 14 may be provided, and the valve body 14 may be formed in a shape made by cutting off one side of a sphere in a planar shape.

In the case that such a flat part 15 is provided, in the valve-closed condition shown in FIG. 1, the spherical surface portion 30, as viewed across the movable seat 16 from the upstream side, can normally be seen, whereas also in the valve-open condition, as shown in FIG. 2, the spherical surface portion 30, as viewed across the movable seat 16 from the upstream side, normally is visible. Further, although not illustrated, in a midway condition between the valve-open condition and the valve-closed condition as well, in a similar manner, the spherical surface portion 30 normally is seen. Accordingly, even in the case that the flat part 15 is provided on the valve body, the gas flow rate is roughly proportional to the angle of rotation, and a linear gas flow rate characteristic can be guaranteed.

Incidentally, with the aforementioned configuration, in accordance with the location of the center of rotation of the valve body 14, or stated otherwise, the axis A1, there may be situations in which so-called "gouging" (abrasion) occurs mutually between the valve body 14 and the movable seat 16. This type of "gouging" promotes (leads to) follow-up of the movable seat 16 with respect to the valve body 14, and adversely influences favorable flow rate characteristics and durability, and therefore, it is desirable to prevent or reduce "gouging". Below, explanation shall be made concerning a structure intended to prevent or reduce such "gouging".

Figure 3:
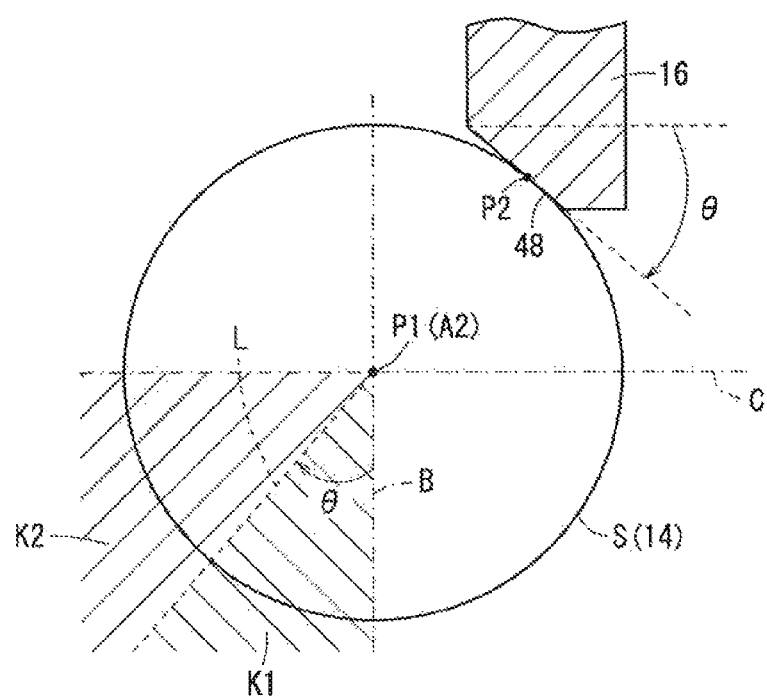
FIG. 3 is an explanatory drawing showing, in relation to a fully closed positional relation between the seat and the valve, a "gouging" existent region and a "gouging" non-existent region, as regulated (set) based on seating angle.

With reference to FIG. 3, explanations shall be given concerning a "gouging" existent region K2 and a "gouging" non-existent region K1. In FIG. 3, a case is exemplified of a roughly spherical valve body 14. However, the following explanations are equally valid for a case in which the flat part 15 (see FIG. 2) is provided on the valve body 14.

As shown in FIG. 3, an angle between the axis C of the movable seat 16 and the seating surface 48 is defined as a seat angle θ, as viewed in cross section in a plane that is perpendicular to an axis of the first shaft 32 and the second shaft 34 and that includes a center of curvature of the valve body 14. Further, when the spherical surface portion 30 of the valve body 14 in the valve-closed condition is taken as a portion of a sphere (virtual sphere) S, a center of the sphere S (i.e., a center of curvature of the spherical surface portion 30) is shown by the point P1, whereas an area of contact between the valve body 14 and the seating surface 48 of the movable seat 16 is shown by the point P2. In the event that the shape thereof is substantially spherical, as in the case of the valve body 14 shown in FIGS. 1 and 2, the center of the sphere S matches with the center of the valve body 14.

Under such a condition, an area defined by an angle of the seat angle θ around the center of the sphere S with respect to a line B, within a region on the side opposite to the movable seat 16 about the line B, which is perpendicular to the axis C of the movable seat 16 and passes through the center of the sphere S when in the valve-closed condition, forms a "gouging" non-existent region K1, whereas the area in excess of the seat angle θ forms a "gouging" existent region K2. A borderline L, which is inclined at the angle θ with respect to the line B, is included within the "gouging" non-existent region K1.

In FIG. 3, because when the valve body 14 is opened, it is taken as a premise that the direction of rotation of the valve body 14 is counterclockwise, the region defined by the seat angle θ with respect to the line B is on a lower side from the axis C. However, in the case that the direction of rotation of the valve body 14 upon opening of the valve body 14 is clockwise in FIG. 3, then the region defined by the seat angle θ with respect to the line B is on the upper side from the axis C.

By setting the center of rotation of the valve body 14, that is, the position of the central location (axis A1) of the first shaft 32 and the second shaft 34, inside the "gouging" non-existent region K1, the rotational trajectory of the valve body 14 does not pass through an inside portion of the movable seat 16, and therefore, the valve body 14 does not press into the movable seat 16 and "gouging" of (abrasion between) the valve body 14 and the movable seat 16 can be prevented. Accordingly, because separation between the valve body 14 and the movable seat 16 can be carried out smoothly, follow-up of the movable seat 16 can be curtailed, and the correct flow rate can be assured.

Incidentally, combustion products (e.g., carbon particles) are included in the exhaust gas that flows in the EGR valve 10A. If such combustion products become deposited and collect on the sliding interface 70 (see FIG. 2) between the movable seat 16 and the seat-confronting portion 58, slidability is reduced, and as a result, there is a concern that the aforementioned alignment function of the movable seat 16 will become deteriorated, and it is difficult for sealability to be secured.

Consequently, in the present embodiment, by providing labyrinthine structures respectively on the inner circumferential side and the outer circumferential side of the sliding interface 70 between the movable seat 16 and the seat-confronting portion 58, incursion of gas toward the side of the sliding interface 70 is suppressed. Owing thereto, deposition of combustion products in the vicinity of the sliding interface 70 can be prevented or suppressed.

More specifically, the inside annular space 67 is provided on the inner circumferential side of the sliding interface 70, and the annular wall 66 is further provided on the inner side of the inside annular space 67, whereby a labyrinthine structure is constituted on the inner side. Thus, gas that flows in through the gas fluid inlet is deposited on the inner circumferential surface of the annular wall 66, whereas incursion of gas to the side of the inside annular space 67 is prevented or suppressed by the annular wall 66, and it is difficult for the gas to reach the inner circumferential side of the aforementioned sliding interface 70.

Further, the outside annular space 49 is formed on the outer circumferential side of the sliding interface 70, and the annular outer circumferential projection 50 is further provided between the outside annular space 49 and the space on the side of the valve body 14, whereby a labyrinthine structure is constituted on the outer side. Thus, gas from the side of the valve body 14 is deposited on the side surface on the X1 side of the annular outer circumferential projection 50, whereas incursion of gas into the outside annular space 49 is prevented or suppressed by the annular outer circumferential projection 50, and it is difficult for the gas to reach the outer circumferential side of the aforementioned sliding interface 70.

In this manner, due to the fact that it is difficult for gas to reach the inner circumferential side and the outer circumferential side of the sliding interface 70, although included within the gas, it is difficult for combustion products and the like to become deposited on the inner circumferential side and the outer circumferential side of the sliding interface 70. Owing thereto, slidability of the sliding interface 70 can be assured, and the alignment function of the movable seat 16 can smoothly and suitably be exhibited.

Since the movable seat 16 and the seat-confronting portion 58 are not in mutual sliding contact over the entire end surfaces thereof, but rather are in sliding contact at respective end surfaces of the first ring-shaped side projection 52 and the second ring-shaped side projection 64, the area of contact between the movable seat 16 and the seat-confronting portion 58 is kept small. Owing thereto, sliding resistance at the sliding interface 70 when the movable seat 16 is displaced in directions perpendicular to the axis C (see FIG. 2) can be reduced, and the alignment function of the movable seat 16 can be exhibited more suitably.

Further, with the present embodiment, because the clearance 68, which is formed between the movable seat 16 and the annular wall 66, is positioned more on the downstream side (side of the valve body 14) of the gas flow direction than the sliding interface 70, even if some gas flows past the clearance 68 and into the inside annular space 67, the gas does not flow to the side of the sliding interface 70 unless the gas flow direction is reversed. Therefore, it is still difficult for the gas to reach the side of the sliding interface 70, and deposition of combustion products can effectively be suppressed.

As described above, the first ring-shaped side projection 52 is provided on the movable seat 16, and the second ring-shaped side projection 64 is provided on the seat-confronting portion 58. Thus, even if combustion products become deposited on the outer circumferential side and the inner circumferential side of the first and second ring-shaped side projections 52, 64, as a result of mutual sliding between the first ring-shaped side projection 52 and the second ring-shaped side projection 64 along with the displacement of the movable seat 16, the combustion products can be sheared off. Accordingly, adhering of the combustion products to the first and second ring-shaped side projections 52, 64 can effectively be prevented, and as a result, the alignment function of the movable seat 16 is exhibited more favorably.

In the event the first ring-shaped side projection 52 and the second ring-shaped side projection 64 are provided, in accordance with positioning of the movable seat 16 and the seat-confronting portion 58, when the valve body 14 is seated on the movable seat 16, there is a concern that the movable seat 16 may become inclined as a whole, whereby sealability in the valve-closed state cannot easily and reliably be assured. Consequently, as shown in FIG. 2, in the present embodiment, the sliding interface 70 between the movable seat 16 and the seat-confronting portion 58 is located more outwardly (on the radial outward side) than the area of contact 51 between the valve body 14 and the movable seat 16 in the valve-closed condition.

By means of this structure, the movable seat 16 is stably supported by the seat-confronting portion 58, such that when the valve body 14 is seated on the movable seat 16, the condition in which the movable seat 16 is in contact with the seat-confronting portion 58 is maintained, and the movable seat 16 is not subjected to inclination. Consequently, sealability between the valve body 14 and the movable seat 16 can suitably be assured, and the occurrence of leakage can effectively be prevented.

Figure 4:
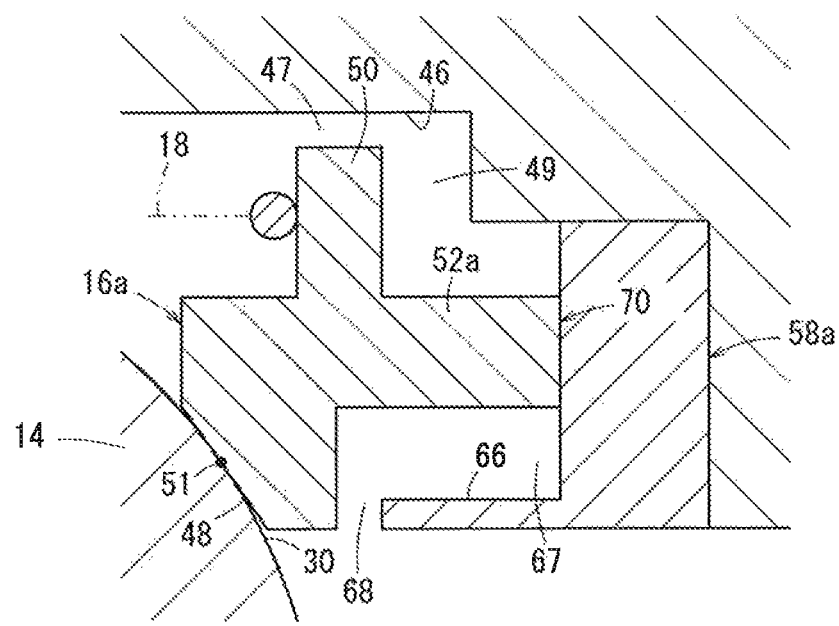
FIG. 4 is an enlarged cross sectional view, partially omitted, showing a first modification of a movable seat and a seat-confronting portion.

With the fluid passage valve 10, in place of the movable seat 16 and the seat-confronting portion 58, as in the first modification shown in FIG. 4, a movable seat 16a and a seat-confronting portion 58a may be adopted. The movable seat 16a comprises a structure in which a ring-shaped side projection 52a is used in place of the aforementioned first ring-shaped side projection 52, and which is longer in the axial direction than the first ring-shaped side projection 52. The seat-confronting portion 58a is constructed without the second ring-shaped side projection 64 that is provided on the seat-confronting portion 58.

In the event that the structure shown in FIG. 4 is adopted, although a shearing effect of combustion products is not obtained, similar to the fluid passage valve 10 shown in FIG. 2 or the like, a function can be obtained in which deposition of combustion products in the vicinity of the sliding interface 70 is prevented or suppressed. Further, with the structure shown in FIG. 4 as well, the position of the sliding interface 70 is located further radially outside than the area of contact 51, and therefore when the valve body 14 is seated on the movable seat 16a, the movable seat 16a does not become inclined, and the occurrence of leakage can effectively be prevented.

Further, as a second modification of the fluid passage valve 10, the first ring-shaped side projection 52 may be eliminated from the movable seat 16 shown in FIG. 2, and a structure may be provided in which the second ring-shaped side projection 64 of the seat-confronting portion 58 extends in the axial direction and abuts against a side surface of the movable seat 16. In the case of the second modification, although a shearing effect on combustion projects is not obtained, similar to the fluid passage valve 10 shown in FIG. 2, a function can be obtained in which deposition of combustion products in the vicinity of the sliding interface 70 is prevented or suppressed. Further, in the second modification as well, the position of the sliding interface 70 is located further radially outside than the area of contact 51, and therefore when the valve body 14 is seated on the movable seat 16, the movable seat 16 does not become inclined, and the occurrence of leakage can effectively be prevented.

Further, as another modification, in the fluid passage valve 10, the annular wall 66 may be arranged on the side of the movable seat 16 away from the side of the seat-confronting portion 58, or alternatively, a structure lacking the annular wall 66 altogether may be provided.

The present invention is not limited to an EGR valve, but can be applied to other types of fluid passage valves, which open and close fluid passages through which gases containing foreign matter therein such as combustion products or the like flow.

Although certain preferred embodiments of the present invention have been shown and described in detail, the invention is not limited by the embodiments, and it should be understood that various changes and modifications may be made without departing from the scope of the invention as set forth in the appended claims.

What is claimed is:

1. A fluid passage valve comprising:
a main body comprising a valve body which is disposed rotatably through a shaft, and a valve chamber in which the valve body is accommodated;
a movable seat having a seating surface on which the valve body is seatable; and
an elastic member for urging the movable seat in a direction opposite to the valve body,
wherein:
the valve body includes at least a spherical surface portion
the shaft is installed on the valve body such that an axis thereof is disposed at a position offset from a center of curvature of the spherical surface portion,
the movable seat includes a communication hole therein, an axis of which lies substantially perpendicularly to the axis of the shaft,
the spherical surface portion of the valve body abuts against the seating surface thereby producing a valve-closed condition by closing the communication hole, and
a valve-open condition is produced by separating the valve body from the movable seat and opening the communication hole.

2. The fluid passage valve according to claim 1, wherein a ring-shaped side projection is provided on at least one of the movable seat and a seat confronting portion on the main body that confronts the movable seat, the ring-shaped side projection projecting in the axial direction and abutting against the other of the movable seat and the seat confronting portion, and a sliding interface between the movable seat and the seat confronting portion is positioned more outwardly than an area of contact of the valve body and the seating surface.

3. The fluid passage valve according to claim 2, wherein an annular outer circumferential projection is provided on an outer circumferential portion of the movable seat, which projects outwardly and in close proximity with respect to an inner circumferential surface of the valve chamber.

4. The fluid passage valve according to claim 2, wherein an annular wall is disposed on one of the seat confronting portion and the movable seat and is positioned more inwardly than the ring-shaped side projection, the annular wall projecting in the axial direction in close proximity with respect to the other of the seat confronting portion and the movable seat.

5. The fluid passage valve according to claim 4, wherein an annular outer circumferential projection is provided on an outer circumferential portion of the movable seat, which projects outwardly and in close proximity with respect to an inner circumferential surface of the valve chamber.

6. The fluid passage valve according to claim 1, wherein an angle between the axis of the movable seat and the seating surface is a seat angle, as viewed in cross section in a plane that is perpendicular to the axis of the shaft and that includes a center of curvature of the valve body, within a region on a side opposite to the movable seat about a line perpendicular to the axis of the movable seat and passing through the center of curvature of the spherical surface portion of the valve body in the valve-closed condition, an axis of rotation of the valve body is set within an area defined by an angle of the seat angle around the center of curvature with respect to the line.

\* \* \* \* \*